(12) United States Patent
Wang et al.

(10) Patent No.: US 11,498,134 B2
(45) Date of Patent: Nov. 15, 2022

(54) METHOD FOR MEASURING DISTRIBUTION OF THRUST FORCE DURING DRILLING OF UNIDIRECTIONAL COMPOSITE

(71) Applicant: Dalian University of Technology, Dalian (CN)

(72) Inventors: Fuji Wang, Dalian (CN); Jiaxuan Hao, Dalian (CN); Yu Bai, Dalian (CN); Wei Liu, Dalian (CN); Jianwei Ma, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 326 days.

(21) Appl. No.: 16/990,760

(22) Filed: Aug. 11, 2020

(65) Prior Publication Data

US 2021/0164851 A1 Jun. 3, 2021

(30) Foreign Application Priority Data

Nov. 29, 2019 (CN) .......................... 201911198283.4

(51) Int. Cl.
*B23B 35/00* (2006.01)
*G01L 5/12* (2006.01)
*B23B 49/00* (2006.01)

(52) U.S. Cl.
CPC .............. *B23B 35/00* (2013.01); *B23B 49/00* (2013.01); *G01L 5/12* (2013.01); *B23B 2226/275* (2013.01); *B23B 2270/483* (2013.01)

(58) Field of Classification Search
CPC ... B23B 35/00; B23B 49/00; B23B 2270/483; B23B 2226/275; G01L 5/12
See application file for complete search history.

(56) References Cited

FOREIGN PATENT DOCUMENTS

| CN | 105678026 A | * | 6/2016 | ............. G06F 30/17 |
| CN | 106326647 A | * | 1/2017 | |

(Continued)

OTHER PUBLICATIONS

Meng, et al., An analytical method for predicting the fluctuation of thrust force during drilling of unidirectional carbon fiber reinforced plastics, (Journal of Composite Materials 2015, vol. 49(6) 699-711) United Kingdom (Year: 2015).*

(Continued)

*Primary Examiner* — Boyer D Ashley
*Assistant Examiner* — Reinaldo A Del Vargas Rio
(74) *Attorney, Agent, or Firm* — Falati Law Firm

(57) ABSTRACT

The present invention belongs to the technical field of machining of fiber-reinforced composites, and relates to a method for measuring distribution of a thrust force during drilling of a unidirectional composite along with a fiber cutting angle. The method includes: cutting the surface a composite sample piece to form a groove; drilling on an existing experimental platform for measuring a thrust force during drilling, where a through hole obtained through the drilling is required to intersect with the groove; obtaining a curve of the thrust force during drilling, comparing the curve with a conventional curve of the thrust force to find a mutation point, and determining the mutation point, namely a fiber cutting angle at the groove; and calculating fluctuation periods of the thrust force according to machining parameters to reckon the distribution of the thrust force along with the fiber cutting angle in all the periods.

1 Claim, 4 Drawing Sheets

(56) References Cited

FOREIGN PATENT DOCUMENTS

| | | | | | |
|---|---|---|---|---|---|
| CN | 107832546 | A | * | 3/2018 | ......... G06F 17/5009 |
| JP | 2009039811 | A | * | 2/2009 | |
| RU | 2369478 | C1 | * | 10/2009 | |

OTHER PUBLICATIONS

Hintze, et al., Evaluation of the total cutting force in drilling of CFRP: a novel experimental method for the analysis of lhe cutting mechanism, (German Academic Society for Production Engineering (WGP) 2018) Pub. Online (Year: 2018).*

Meng, et al., An analytical method for predicting the fluctuation of thrust force during drilling of undirectional carbon fiber reinforced plastics, (Journal of Composite Materials 2015, vol. 49(6) 699-711) United Kingdom.

Hintze, et al., Evaluation of the total cutting force in drilling of CFRP: a novel experimental method for the analysis of the cutting mechanism, (German Academic Society for Production Engineering (WGP) 2018) Pub. Online.

* cited by examiner (a) (b)

(a)

(b)

METHOD FOR MEASURING DISTRIBUTION OF THRUST FORCE DURING DRILLING OF UNIDIRECTIONAL COMPOSITE

TECHNICAL FIELD

The present invention belongs to the technical field of machining of fiber-reinforced composites, and relates to a method for measuring distribution of a thrust force during drilling of a unidirectional composite.

BACKGROUND

Fiber-reinforced composites have been widely used in aerospace and other fields by virtue of their excellent mechanical properties such as light weight and high strength. It is necessary to drill a large number of connecting holes to connect parts for assembly during production, and the connection properties of the parts are directly influenced by drilling quality. Twist drills widely used in actual production achieve good machinability during drilling of fiber composites by virtue of their excellent chip removal capabilities and high drilling efficiency.

However, the composites are prone to being layered or cracked when drilled due to their low interlaminar bonding strength, and a thrust force during drilling is a key factor causing layering and intensifying the layering. The composites microscopically show a mixed state of fibers, resin, and interfaces and macroscopically show mechanical anisotropy, as a result, material removal mechanisms of cutting in different fiber directions by a tool during drilling are different. Thrust forces from a tool at different fiber cutting angles may be periodically fluctuated and will greatly influence damage distributions.

Nevertheless, in the drilling process, existing thrust force measuring instruments cannot identify the rotation angle of the tool, and are almost impossible to detect the position of the cutting edge of the tool and a change to values of the thrust forces simultaneously. Consequentially, it is difficult to accurately measure the change rule of the thrust forces along with the fiber cutting angles. Thus, there is a great need in the art for new and improved methods to address this concern.

SUMMARY

To settle the existing technical issue, the present invention provides a method for measuring distribution of a thrust force during drilling of a unidirectional composite. The method includes: using a unidirectional fiber-reinforced composite as a sample piece, and cutting the surface of the sample piece at a specific position to form a groove for defining the rotation position of a tool; drilling on an existing experimental platform for measuring a thrust force during drilling, where a through hole obtained through the drilling is required to intersect with the groove in the sample piece; acquiring a time-depending curve of the thrust force during the drilling; comparing the time-depending curve with a conventional curve of the thrust force to find a mutation point in any fluctuation period, where a cutting edge rotates to the groove in the sample piece at the mutation point; determining the fiber cutting angle at the groove to obtain the value of a thrust force at this fiber cutting angle; and furthermore, reckoning the distribution of the thrust force along with the fiber cutting angle in all the periods according to the rotational speed of the tool. According to the present invention, there is no need to change a drilling state or build a novel experimental platform, so that the experiment is easy to operate; the distribution of the thrust force is measured, and an accurate and reliable result is obtained. The method is simple, and can accurately measure the distribution of the thrust force along with the fiber cutting angle and avoid errors caused by a change to drilling conditions.

The technical solution adopted by the present invention is as follows: a method for measuring distribution of a thrust force during drilling of a unidirectional composite includes: cutting a sample piece to form a groove A, and drilling with thrust force measurement to obtain a round hole B; obtaining a time-dependent curve of the thrust force during drilling, and comparing the time-dependent curve with a conventional curve of the thrust force to determine a mutation time of the thrust force in any fluctuation period; calculating a mutation point of the thrust force, namely a fiber cutting angle θ, according to a fiber direction k, the groove A, and the round hole B; and further calculating distribution of the thrust force along with the fiber cutting angle in all the periods according to the thrust force and the fiber cutting angle at the mutation time in combination with machining parameters. Specific experiment and calculation are performed through the following steps:

(1) conventionally drilling the sample piece to obtain the round hole without specially processing the sample piece, and measuring the thrust force to obtain the time-dependent curve of the thrust force during conventional drilling;

(2) cutting, by a tool, a fiber-reinforced composite plate in a suitable size in a direction perpendicular to a machining surface of the sample piece from an edge to the center of the sample piece to form the groove A having a length about half a width of the sample piece, a width considerably less than a diameter of a drilling diameter, and a depth equal to a thickness of the sample piece;

(3) clamping the drilled sample piece in an experimental platform for measuring the thrust force during drilling, using a conventional twist drill for composite machining as a drilling tool, adjusting a drill tip to be aligned to the groove in the surface of the sample piece for drilling to obtain the round hole B, and obtaining thrust force data;

(4) defining a direction of a fiber pointing to the machined surface as the fiber direction k, an instantaneous rotation direction of a cutting edge of the tool, namely a tangential direction of any point on a circumference of the round hole, as a velocity direction v, and the fiber cutting angle θ as an included angle of 0°-180° between the velocity direction v and the fiber direction k; and determining the fiber cutting angle θ at the groove in the drilled sample piece based on the above definitions.

(5) analyzing a curve of the thrust force, and comparing the curve of the thrust force with the conventional time-dependent curve of the thrust force in Step (1) to find a mutation time of the thrust force in any fluctuation period, where the cutting edge is located at the groove at the mutation time, and a value of the thrust force corresponds to the fiber cutting angle at the groove;

(6) calculating the time of one revolution of the tool according to actual machining parameters, where the fiber cutting angle θ is changed twice from 180° to 0° during one revolution of the tool, and accordingly, a fluctuation period T of the thrust force is equal to half a rotation period of the tool; obtaining a curve of the thrust force within a time segment of one fluctuation period with the fiber cutting angle of 180° as a starting point, namely distribution curve of the thrust force at the fiber cutting angle θ of 180°-0°:

$$T = \frac{60}{2n} \quad (1)$$

where, T represents the fluctuation period (s) of the thrust force, and n represents a rotational speed (r/min);

(7) obtaining distribution curve of the thrust force during conventional drilling along with the fiber cutting angle by making a peak, a minimum, and a curvilinear trend of a fluctuated thrust force corresponding to those of the thrust force during conventional drilling according to the relation, obtained in Step (6), between the fluctuated thrust force and the fiber cutting angle.

The present invention has the following beneficial effects: the thrust force can be measured by only cutting the sample piece without changing the existing experimental platform for measuring a thrust force during drilling, so that the method is easy to operate; a small groove is formed by cutting the sample piece, and a semi-enclosed environment for tool drilling is not changed basically, so that stability of periodic fluctuations of the thrust force is guaranteed; and the curve mutations of the thrust force are directly read by means of comparison to determine the corresponding relation between the thrust force and the fiber cutting angle, so that an accurate distribution rule of the thrust force along with the fiber cutting angle can be obtained.

DETAILED DESCRIPTION

Figure 1:
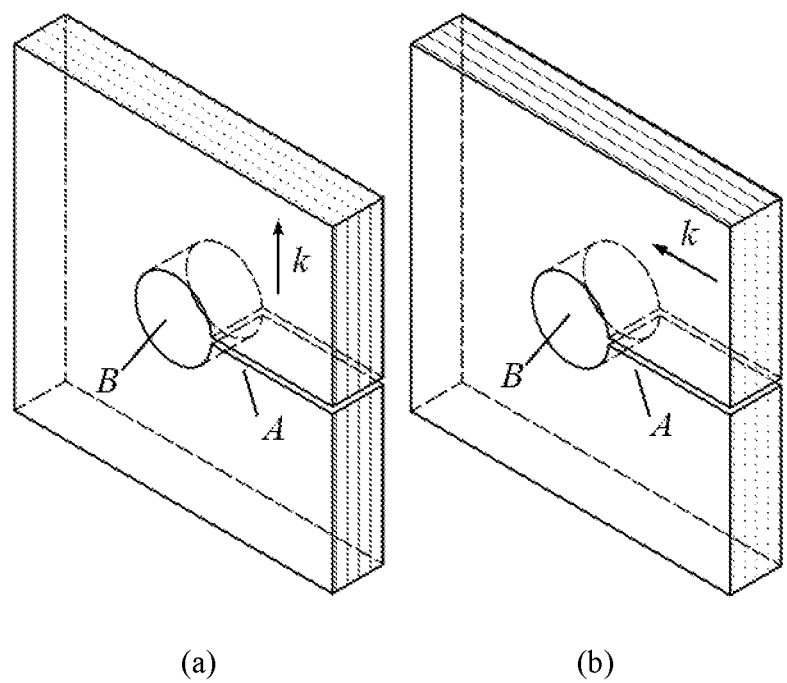
FIG. 1 is a schematic diagram of cutting a groove in a sample piece and drilling the sample piece, where k represents a fiber direction, A represents the groove, B represents a round hole, the fiber direction k in FIG. (a) is vertical, and the fiber direction k in FIG. (b) is horizontal.
Figure 2:
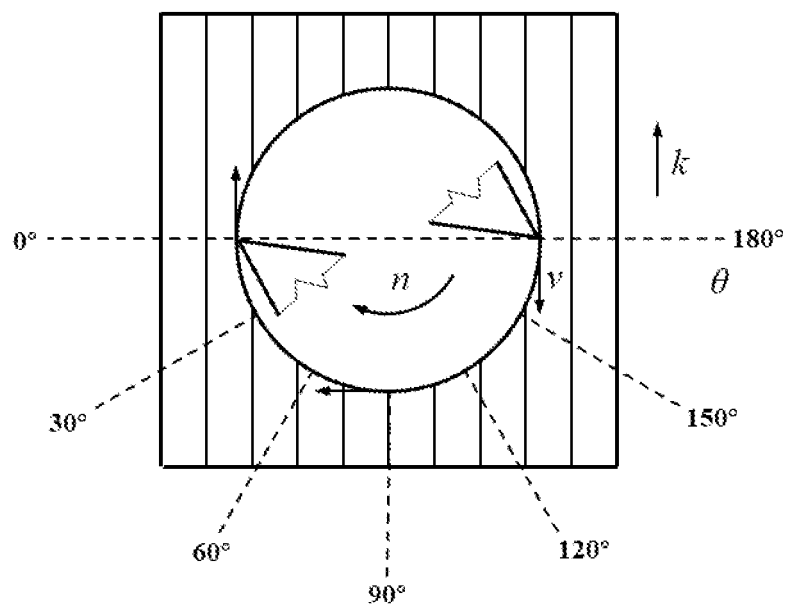
FIG. 2 is a schematic diagram of defining a fiber cutting angle, where k represents the fiber direction, v represents a velocity direction, θ represents the fiber cutting angle (°), n represents a rotational speed (r/min)
Figure 3:
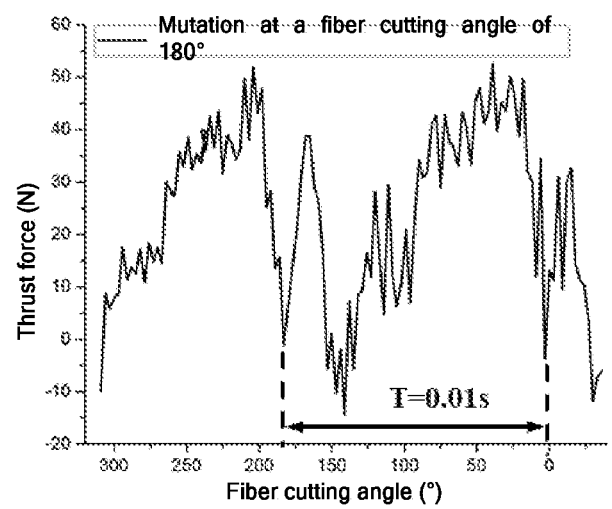
FIG. 3 shows fluctuation curves of thrust forces at different angles.
Figure 3:
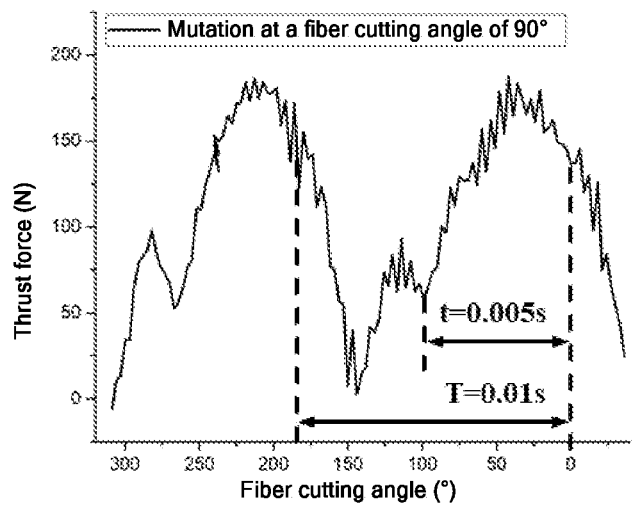
Figure 4:
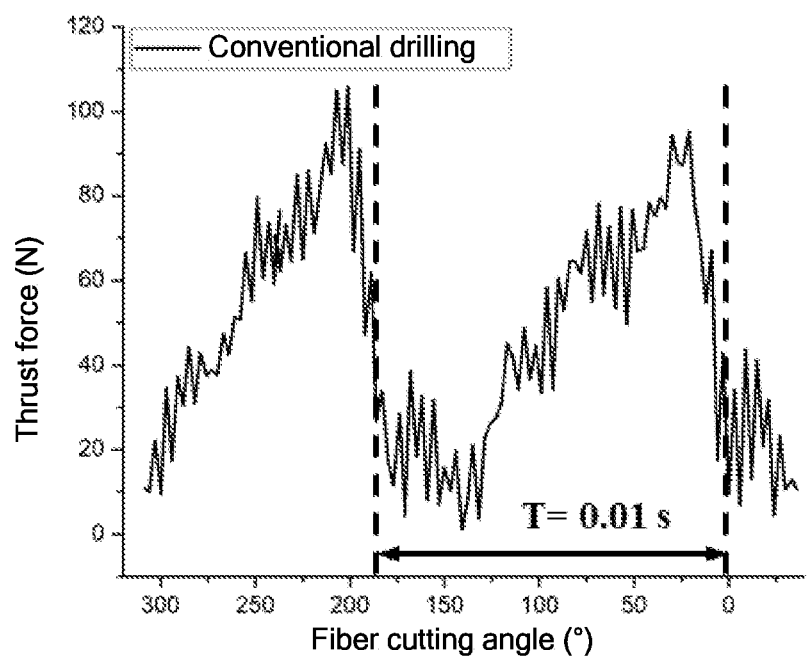
FIG. 4 is distribution curve of a thrust force during conventional drilling along with the fiber cutting angle, where an x-coordinate shows the fiber cutting angle (°), and a y-coordinate shows the thrust force (N).

The specific implementations of the present invention are described in more detail below with reference to the accompanying drawings and technical solutions. A unidirectional T800 carbon fiber-reinforced composite plate used in this example is 4 mm thick and cut into 24*24 mm test pieces. In an experiment, a twist drill having a small vertex angle and a diameter of 6 mm as well as a universal platform for measuring a thrust force during drilling is used, and a rotational speed of 3000 r/min and a feed speed of 90 mm/min are set as machining parameters. To verify the effectiveness of a method, the distributions of two groups of fibers are measured through the following steps:

(1) conventionally drill a sample piece without processing the sample piece, measure a thrust force from a tool, and obtain a time-dependent curve of the thrust force in a stable drilling stage, as shown in FIG. 4 showing a comparison of curve mutations of the thrust force;

(2) set a fiber direction k of an arranged sample piece to be vertical; cut the sample piece, by a cutting machine having a diamond wire perpendicular to a drilling surface, leftwards from a midpoint of the right edge to the center of the sample piece by a distance of 12 mm to form a 0.5 mm wide and 4 mm deep groove A, as shown in FIG. 1; and take down the sample piece;

(3) clamp the sample piece in an experimental platform for drilling; manually adjust the drill tip of a drill bit to be aligned to the groove A in the center of the sample piece to make sure that a drilled round hole B intersects with the groove A; drill after parameters of an thrust force measuring instrument and machining parameters of a machine tool are set, and then take down the sample piece, as shown in FIG. 1(a); and obtaining data from the thrust force measuring instrument for analysis;

(4) as shown in FIG. 2, determine a fiber direction k and a velocity direction v at the groove according to a fiber distribution direction and a drilling position on the surface of the sample piece to obtain an included angle between the fiber direction k and the velocity direction v, that is, a fiber cutting angle θ at the groove is 180°;

(5) extract a thrust force from the twist drill during drilling, compare a fluctuation curve of the thrust force in a stage where the drill bit fully enters the sample piece with the time-dependent curve of the thrust force in Step 1 to find a mutation point corresponding to the fiber cutting angle of 180° in any fluctuation period of the thrust force;

(6) calculate the fluctuation period of the thrust force as follows:

$$T = \frac{60}{2n} = \frac{60}{2 \times 3000} = 0.01 \text{ s} \quad (2)$$

and correspondingly, obtain a curve, showing the distribution of the thrust force at the fiber cutting angle of 180°-0° as shown in FIG. 3(a), of the thrust force within 0.01 s with a mutation time as a starting time;

(7) set the fiber direction k of the arranged sample piece to be horizontal, as shown in FIG. 1(b); repeating Steps 1-5 to obtain a groove at a fiber cutting angle of 90° and a fluctuation curve, corresponding to the fiber cutting angle of 90°, of the thrust force, as shown in FIG. 3 (b);

(8) compare the relation between the thrust force and the fiber cutting angle when the fibers are distributed at 180° and 90°, where experimental results are almost the same, and in this way, the experimental method is verified to be reasonable and feasible; and furthermore, obtain distribution curve of a thrust force during conventional drilling along with the fiber cutting angle according to peaks, minimums, and curvilinear trends of a fluctuated thrust force and the thrust force during conventional drilling, as shown in FIG. 4.

The present invention achieves the distribution of a thrust force during drilling of a unidirectional fiber-reinforced composite along with a fiber cutting angle. A common twist drill is used for a machining experiment, and the experiment is easy to operate without changing an original experimental platform for measuring a thrust force during drilling. The measurement method will not greatly affect the drilling, and the overall change trend of the measured thrust force is almost the same as that during conventional drilling. The fiber cutting angle corresponding to the mutation point of the thrust force is calibrated according to the mutation point of the thrust force, so that an accurate measurement result can be obtained. In summary, the present invention provides a method for accurately measuring distribution of a thrust force during drilling of a fiber-reinforced composite along with a fiber cutting angle to provide a reliable experimental basis for building and analysis a subsequent theoretical model and optimization of a cutting technology to avoid damage.

What is claimed is:

1. A method for measuring distribution of a thrust force during drilling of a unidirectional composite, comprising: cutting a sample piece to form a groove (A), and drilling with thrust force measurement to obtain a round hole (B); obtaining a time-dependent curve of the thrust force during drilling, and comparing the time-dependent curve with a conventional curve of the thrust force to determine a mutation time of the thrust force in any fluctuation period; calculating a mutation point of the thrust force, namely a fiber cutting angle θ, according to a fiber direction (k), the groove (A), and the round hole (B); and further calculating distribution of the thrust force along with the fiber cutting angle θ in all the periods according to the thrust force and the fiber cutting angle at the mutation time in combination with machining parameters; and specific experiment and calculation are performed through the following steps:

(1) conventionally drilling the sample piece to obtain the round hole without specially processing the sample piece, and measuring the thrust force to obtain the time-dependent curve of the thrust force during conventional drilling;

(2) cutting, by a tool, a fiber-reinforced composite plate in a suitable size in a direction perpendicular to a machining surface of the sample piece from an edge to a center of the sample piece to form the groove (A) having a length about half a width of the sample piece, a width considerably less than a diameter of a drilling diameter, and a depth equal to a thickness of the sample piece;

(3) clamping the drilled sample piece in an experimental platform for measuring the thrust force during drilling, using a conventional twist drill for composite machining as a drilling tool, adjusting a drill tip to be aligned to the groove in the surface of the sample piece for drilling to obtain the round hole (B), and obtaining thrust force data;

(4) defining a direction of a fiber pointing to the machined surface as the fiber direction (k), an instantaneous rotation direction of a cutting edge of the tool, namely a tangential direction of any point on a circumference of the round hole, as a velocity direction v, and the fiber cutting angle θ as an included angle of 0°-180° between the velocity direction v and the fiber direction k; and determining the fiber cutting angle θ at the groove in the drilled sample piece based on the above definitions, (5) analyzing a curve of the thrust force, and comparing the curve of the thrust force with the conventional time-dependent curve of the thrust force in Step (1) to find a mutation time of the thrust force in any fluctuation period, wherein the cutting edge is located at the groove at the mutation time, and a value of the thrust force corresponds to the fiber cutting angle at the groove;

(6) calculating the time of one revolution of the tool according to actual machining parameters, wherein the fiber cutting angle θ is changed twice from 180° to 0° during one revolution of the tool, and accordingly, a fluctuation period T of the thrust force is equal to half a rotation period of the tool; obtaining a curve of the thrust force within a time segment of one fluctuation period with the fiber cutting angle of 180° as a starting point, namely distribution curve of the thrust force at the fiber cutting angle of 180°-0°:

$$T = \frac{60}{2n} \quad (1)$$

wherein, T represents the fluctuation period (s) of the thrust force, and n represents a rotational speed (r/min);

(7) obtaining distribution curve of the thrust force during conventional drilling along with the fiber cutting angle by making a peak, a minimum, and a curvilinear trend of a fluctuated thrust force corresponding to those of the thrust force during conventional drilling according to the relation, obtained in Step (6), between the fluctuated thrust force and the fiber cutting angle.

* * * * *